(12) United States Patent
Liu

(10) Patent No.: US 7,792,509 B2
(45) Date of Patent: Sep. 7, 2010

(54) TRANSCEIVER WITH MULTI-STATE DIRECT DIGITAL SYNTHESIZER DRIVEN PHASE LOCKED LOOP

(75) Inventor: Jigang Liu, Xi'An P.R. (CN)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 10/500,620

(22) PCT Filed: Dec. 9, 2002

(86) PCT No.: PCT/IB02/05349

§ 371 (c)(1),
(2), (4) Date: Jul. 1, 2004

(87) PCT Pub. No.: WO03/058833

PCT Pub. Date: Jul. 17, 2003

(65) Prior Publication Data

US 2005/0169416 A1    Aug. 4, 2005

(30) Foreign Application Priority Data

Jan. 7, 2002   (EP) .................................. 02075026

(51) Int. Cl.
*H04B 1/06*   (2006.01)
*H04B 7/00*   (2006.01)

(52) U.S. Cl. ........................ 455/260; 455/75; 455/76; 455/118

(58) Field of Classification Search ............ 455/75–76, 455/260, 118, 84, 86, 313, 318, 323; 375/219, 375/222, 376, 373; 331/1 R
See application file for complete search history.

(56) References Cited

U.S. PATENT DOCUMENTS

| | | | |
|---|---|---|---|
| 5,319,798 A * | 6/1994 | Watanabe | 455/76 |
| 5,423,076 A * | 6/1995 | Westergren et al. | 455/86 |
| 5,794,131 A * | 8/1998 | Cairns | 455/76 |
| 5,859,570 A | 1/1999 | Itoh | |
| 6,226,276 B1 * | 5/2001 | Na | 370/294 |
| 6,370,361 B1 * | 4/2002 | Hung et al. | 455/83 |
| 6,466,803 B1 * | 10/2002 | Gardner | 455/553 |

FOREIGN PATENT DOCUMENTS

| | | |
|---|---|---|
| DE | 197 55 102 A1 | 6/1998 |
| EP | 0 852 439 A2 | 8/1998 |
| JP | 61-285830 | 12/1986 |
| JP | 1989-208005 | 8/1989 |
| WO | WO 92/22147 A1 | 12/1992 |

OTHER PUBLICATIONS

International Search Report dated May 8, 2003 in connection with PCT Application No. PCT/IB02/05349.

* cited by examiner

Primary Examiner—Tuan H Nguyen

(57) ABSTRACT

Transceivers for use in time division telecommunication units in a transmitting mode, include switching a direct digital synthesizer (DDS) driven phase locked loop (PLL) into a modulating state and supplying a modulation signal to the DDS and switching in the PLL a first filter, thus allowing the generation of an improved modulated signal. In a receiving mode, the DDS driven PLL is switched into an oscillating state including supplying a non-modulation signal to the DDS and switching in the PLL a second filter, thus allowing demodulation with reduced phase noise. A transmitter part and a non-transmitter part share a single DDS driven PLL.

17 Claims, 1 Drawing Sheet

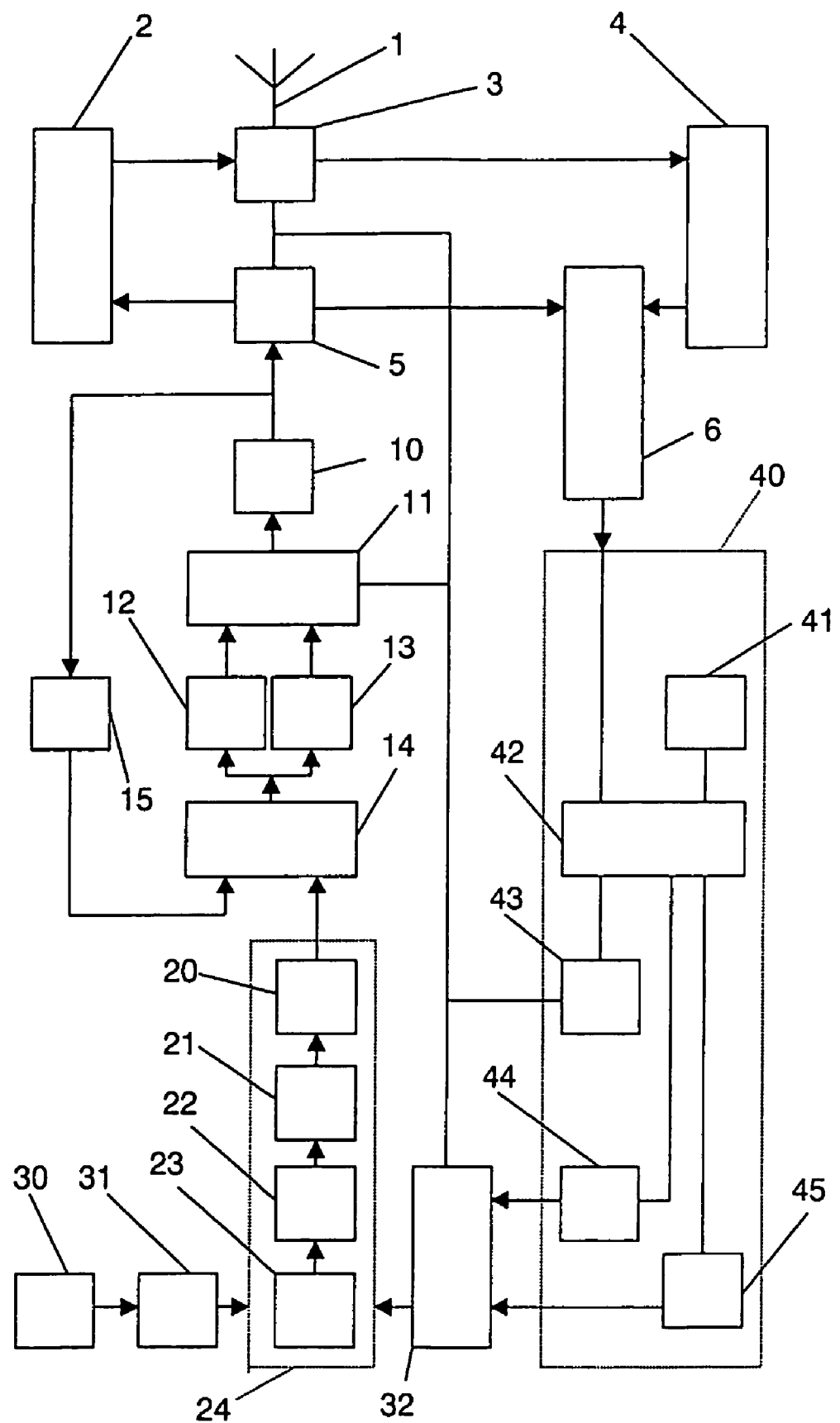

TRANSCEIVER WITH MULTI-STATE DIRECT DIGITAL SYNTHESIZER DRIVEN PHASE LOCKED LOOP

The invention relates to a transceiver for transmitting signals in a transmitting mode and for receiving signals in a receiving mode and comprising a digital synthesizer driven phase locked loop.

The invention also relates to a digital synthesizer driven phase locked loop for use in a transceiver for transmitting signals in a transmitting mode and for receiving signals in a receiving mode and comprising said digital synthesizer driven phase locked loop, and to a phase locked loop for use in a digital synthesizer driven phase locked loop for use in a transceiver for transmitting signals in a transmitting mode and for receiving signals in a receiving mode and comprising said digital synthesizer driven phase locked loop, and to a digital synthesizer for use in a digital synthesizer driven phase locked loop for use in a transceiver for transmitting signals in a transmitting mode and for receiving signals in a receiving mode and comprising said digital synthesizer driven phase locked loop, and to a system comprising at least one portable unit and at least one network unit for radio communication, with at least one unit comprising at least one transceiver for transmitting signals in a transmitting mode and for receiving signals in a receiving mode and comprising a digital synthesizer driven phase locked loop, and to a portable unit comprising a transceiver for transmitting signals in a transmitting mode and for receiving signals in a receiving mode and comprising a digital synthesizer driven phase locked loop, and to a network unit comprising at least one transceiver for transmitting signals in a transmitting mode and for receiving signals in a receiving mode and comprising a digital synthesizer driven phase locked loop, and to a method for transmitting signals in a transmitting mode and for receiving signals in a receiving mode via a digital synthesizer driven phase locked loop.

Such a transceiver is for example used in time division duplex (TDD) telecommunication systems or time division multiple access (TDMA) telecommunication systems, with said portable unit for example being a mobile phone and with said network unit for example being a base station or a router or a server etc.

Such a transceiver is known from U.S. Pat. No. 5,859,570, which discloses a direct digital synthesizer (DDS) supplying a reference signal for a phase locked loop (PLL). According to this prior art, this DDS driven PLL uses a divided and frequency converted DDS signal as a reference for the PLL.

It is an object of the invention, inter alia, of providing a low cost transceiver as defined in the preamble.

The transceiver according to the invention is characterized in that said digital synthesizer driven phase locked loop, in said transmitting mode, is in a modulating state, with said digital synthesizer driven phase locked loop, in said receiving mode, being in an oscillating state.

By letting a transmitter part and a receiver part of said transceiver according to the invention share a single DDS driven PLL, which in said transmitting mode, is in a modulating state, and which in said receiving mode, is in an oscillating state (a frequency synthesizer state), a low cost transceiver has been provided.

The invention is based upon a basic idea, inter alia, of using important parts in low cost transceivers, having a transmitting mode and a receiving mode, for both modes, instead of using different parts for different modes.

The invention solves the problem, inter alia, of providing a low cost transceiver, which has a simple construction and nevertheless offers a good performance.

A first embodiment of the transceiver according to the invention as defined in claim 2 is advantageous in that said DDS receives, dependently upon the state in which it is, a modulation signal or a non-modulation signal, thereby avoiding any (state) switching inside the DDS.

A second embodiment of the transceiver according to the invention as defined in claim 3 is advantageous in that a low cost switch is used under control of a controller which for example comprises a mode detector for detecting a transmitting mode and a receiving mode and for example comprises a control signal generator for in response to said detecting generating said control signals. The first control signal and the second control signal respectively may be completely different control signals or may be the same control signal having a first value and a second value respectively.

A third embodiment of the transceiver according to the invention as defined in claim 4 is advantageous in that said PLL comprises, in said modulating state, a first filtering performance allowing the generation of an improved modulated signal, with said PLL comprising, in said oscillating state, a second filtering performance allowing demodulation with reduced phase noise.

A fourth embodiment of the transceiver according to the invention as defined in claim 5 is advantageous in that said first filter for example being a loop filter and said second filter for example being a narrow band filter are being selected via a low cost switch. The first control signal and the second control signal respectively may be completely different control signals or may be the same control signal having a first value and a second value respectively.

A fifth embodiment of the transceiver according to the invention as defined in claim 6 is advantageous in that said PLL generates, dependently upon the state in which it is, a modulated signal destined for a transmitter part or a non-modulated signal destined for a non-transmitter part.

A sixth embodiment of the transceiver according to the invention as defined in claim 7 is advantageous in that low cost switches are used for supplying said modulated signal via said transmitter part to said antenna and for supplying said non-modulated signal to a demodulator for demodulating a radio signal received via said antenna and said receiver part. The transmitter part for example comprises an auto gain controller, a filter and a power amplifier. The receiver part for example comprises a filter, a low noise amplifier and an auto gain controller, with said demodulator for example working in a Zero Intermediate Frequency mode or a Near Zero Intermediate Frequency mode. The first control signal and the second control signal respectively may be completely different control signals or may be the same control signal having a first value and a second value respectively. Said demodulator and/or said receiver part together form said non-transmitter part.

Embodiments, of the digital synthesizer driven phase locked loop according to the invention, of the phase locked loop according to the invention, of the digital synthesizer according to the invention, of the system according to the invention, of the portable unit according to the invention, of the network unit according to the invention, and of the method according to the invention, correspond with the embodiments of the transceiver according to the invention.

These and other aspects of the invention will be apparent from and elucidated with reference to the embodiments(s) described hereinafter.

FIG. 1 illustrates in block diagram form a transceiver according to the invention comprising a digital synthesizer driven phase locked loop according to the invention having a digital synthesizer according to the invention and a phase locked loop according to the invention.

FIG. 1 illustrates in block diagram form a transceiver according to the invention comprising a single direct digital synthesizer driven phase locked loop (DDS driven PLL) 24,10-15 according to the invention having a direct digital synthesizer (DDS) 24 according to the invention and a phase locked loop (PLL) 10-15 according to the invention. The transceiver comprises an antenna 1 coupled to an in/output of a switch 3 of which an input is coupled to an output of a transmitter part 2 and of which an output is coupled to an input of a receiver part 4. An input of transmitter part 2 is coupled to a first output of a switch 5, of which a second output is coupled to a first input of a demodulator 6 and of which an input is coupled to an output of PLL 10-15. A second input of demodulator 6 is coupled to an output of receiver part 4 and an output of demodulator 6 is coupled to an input of a controller 40.

PLL 10-15 comprises a voltage controlled oscillator (VCO) 10 of which an output forms the output of the PLL 10-15 and is further coupled to an input of a divider 15, of which an output is coupled to a first input of a phase detector 14. A second input of phase detector 14 is coupled to an output of DDS 24, and an output of phase detector 14 is coupled to inputs of two parallel filters 12,13, with an output of first filter 12 being coupled to a first input of a switch 11 and with an output of a second filter 13 being coupled to a second input of said switch 11. An output of switch 11 is coupled to an input of VCO 10.

DDS 24 comprises a filter 20 of which an output forms the output of DDS 24 and of which an input is coupled to an output of a D/A converter 21, of which an input is coupled to an output of a sine shaper 22 (like for example a ROM). An input of sine shaper 22 is coupled to an output of a phase accumulator 23. A clock input of DDS 24 is coupled via a multiplier 31 to a clock generator 30 and a signal input of DDS 24 is coupled to an output of a switch 32.

Controller 40 comprises a processor/memory system 42 coupled to the output of demodulator 6 and further coupled to a mode detector 41 (which possibly but not shown is further coupled to transmitter part 2 and/or receiver part 4 and/or demodulator 6) and to a control signal generator 43 and to a non-modulation signal generator 44 and to a modulation signal generator 45. An output of modulation signal generator 45 is coupled to a first input of switch 32, and an output of non-modulation signal generator 44 is coupled to a second input of switch 32. An output of control signal generator 43 is coupled to control inputs of switches 11, 32, 3 and 5.

In time division telecommunication systems like time division duplex (TDD) telecommunication systems or time division multiple access (TDMA) telecommunication systems, during one or more first time slots, modulated signals are transmitted from the transceiver according to the invention to an other transceiver (transmitting mode), and during one or more second time slots, modulated signals are sent from the other transceiver to the transceiver according to the invention (receiving mode). According to prior art, a DDS driven PLL is used for generating a reference signal, like in U.S. Pat. No. 5,859,570, which discloses a DDS driven PLL operating in a frequency synthesizing mode.

According to the invention—based upon a basic idea, inter alia, of using important parts in low cost transceivers, having a transmitting mode and a receiving mode, for both modes, instead of using different parts for different modes—said DDS driven PLL, in said transmitting mode, is in a modulating state, with said DDS driven PLL, in said receiving mode, being in an oscillating state.

Thereto, mode detector 41 detects the transceiver, during a first time-interval, being in a transmitting mode, for example via a coupling not shown to transmitter part 2, and/or for example by making a calculation, with said first and second time slots being standardized, and informs processor/memory system 42, which instructs modulation signal generator 45 to generate a modulation signal (for example in response to an audio signal originating from a man-machine-interface not shown and coupled to processor/memory 42) and instructs control signal generator 43 to generate a first control signal. In response to this first control signal, switch 32 supplies said modulation signal originating from modulation signal generator 45 to DDS 24, and switch 11 couples first filter 12 to VCO 10, with first filter 12 for example being a loop filter for improving the PLL function and for example having a bandwidth which is equal to or a little larger than the (occupied) bandwidth of the modulation signal. DDS 24 receives a multiplied clock signal comprising clock pulses via multiplier 31 and clock generator 30, and receives said modulation signal. At the hand of DDS 24, any signal including complex waveforms can be generated by defining one or more of at least three parameters being frequency, phase and amplitude respectively. These three parameters respectively can be controlled by frequency control words (with frequency modulation being achieved before/in phase accumulator 23), phase control words (with phase modulation being achieved between/in phase accumulator 23 and sine shaper 22) and amplitude control words (with amplitude modulation being achieved between/in sine shaper 22 and D/A converter 21) respectively. Said modulation signal manipulates one or more of these control words, and as a result, DDS 24 generates a modulated reference signal which is supplied to PLL 10-15, which, via phase detector 14 and first filter 12 and switch 11 and VCO 10, with divider 15 being in a feedback loop, locks this modulated reference signal. The locked modulated reference signal is supplied via switch 5 to transmitter part 2, due to switch 5, for example in response to said first control signal or a further control signal originating from controller 40, connecting VCO 10 with transmitter part 2. Transmitter part 2, for example comprising an auto gain controller, a filter and a power amplifier, supplies an amplified, filtered and gain controlled locked modulated reference signal to switch 3 and therefore provides a direct digital RF modulation. Switch 3 supplies this signal to antenna 1, due to switch 3, for example in response to said first control signal or a further control signal originating from controller 40 via a coupling not shown, connecting transmitter part 2 with antenna 1. So, during this first time-interval, the transceiver is in a transmitting mode, and the DDS driven PLL 24,10-15 is in a modulating state.

Then, mode detector 41 detects the transceiver, during a second time-interval, being in a receiving mode, for example via a coupling not shown to receiver part 4, and/or for example by making a calculation, with said first and second time slots being standardized, and informs processor/memory system 42, which possibly instructs non-modulation signal generator 44 to generate a non-modulation signal (for example a dc-voltage adaptable via processor/memory system 42 or a ground voltage in which case said instructing does not necessarily have to take place) and instructs control signal generator 43 to generate a second control signal. In response to this second control signal, switch 32 supplies said non-modulation signal originating from non-modulation signal generator 44 to DDS 24, and switch 11 couples second filter 13 to VCO 10, with second filter 13 for example being a narrow band filter allowing demodulation with reduced phase noise. DDS 24 now generates a non-modulated reference signal (due to said non-modulation signal now not manipulating said control words but either supplying/defining predefined/fixed control words or not supplying/defining any control words at all in which case DDS 24 will use its own predefined/fixed values), which is supplied to PLL 10-15, which, via phase detector 14 and second filter 12 and switch 11 and VCO 10, with divider 15 being in a feedback loop, locks this non-modulated reference signal. The locked non-modulated reference signal is supplied via switch 5 to demodulator 6, due to switch 5, for example in response to said second control signal or a further control signal originating from controller 40, connecting VCO 10 with demodulator 6. Receiver part 4, for example comprising a filter, a low noise amplifier and an auto gain controller, receives a (modulated) radio signal via antenna 1 and switch 3. Switch 3, for example in response to said second control signal or a further control signal originating from controller 40 via a coupling not shown, connects antenna 1 with receiver part 4, and supplies a gain controlled, amplified and filtered (modulated) radio signal to demodulator 6, which demodulates (for example via a Zero IF mode or Near Zero IF mode, which is very advantageous in that no expensive and bulky SAW IF filters are required) said last mentioned signal via said locked non-modulated reference signal. As a result, a demodulated signal is supplied to controller 40, for example via processor/memory system 42 to a man-machine-interface not shown which in response generates an audio signal. So, during this second time-interval, the transceiver is in a receiving mode, and the DDS driven PLL 24,10-15 is in an oscillating state.

By letting a transmitter part and a non-transmitter part (comprising a receiver part and/or a demodulator) of said transceiver according to the invention share a single DDS driven PLL, which in said transmitting mode, is in a modulating state, and which in said receiving mode, is in an oscillating state (a frequency synthesizer state), a low cost transceiver has been provided. Compared to prior art, like U.S. Pat. No. 5,859,570 disclosing a DDS driven PLL always being in a frequency synthesizer state, the transceiver according to the invention is very advantageous, due to using said DDS driven PLL for different purposes. In other words, the transceiver is implemented using Radio Frequency direct modulation based on the DDS driven PLL and Radio Frequency demodulation (for example Zero IF, or Near Zero IF) based on the DDS driven PLL, which makes the transceiver low cost and small in size.

The invention solves the problem, inter alia, of providing a low cost transceiver (due to said transmitter part and said non-transmitter part—comprising said receiver part and/or said demodulator—sharing a single DDS driven PLL), which has a simple construction (by using one or more of said low cost switches) and nevertheless offers a good performance (due to the PLL dependently upon its mode using a specific mode-dependent filter). As a result, the transceiver according to the invention has a fast locking time in combination with less components, and therefore can have a smaller size and a lower weight.

Each block shown or not shown, can be 100% hardware, 100% software or a mixture of both. Each block shown or not shown can be integrated with each other block shown and/or not shown. For example in controller 40, mode detector 41, control signal generator 43, non-modulation signal generator 44 and modulation signal generator 45 can be partly or entirely integrated with processor/memory system 42. Switch 32 can for example be located between DDS 24 and controller 40, or can for example form part of DDS 24 or controller 40 (in which case switch 32 can be partly or entirely integrated with processor/memory system 42). Switch 11 can for example form part of PLL 10-15, or can for example be located between PLL 10-15 and controller 40 (in which case filters 12,13 can for example be one or more filters which can be (de)activated and/or adjusted for providing first and second filtering performances), or can for example form part of controller 40 (in which case switch 32 can be partly or entirely integrated with processor/memory system 42, with filters 12,13 being one or more filters which can be (de)activated and/or adjusted for providing first and second filtering performances). Switch 32 can for example correspond with a demultiplexer, switch 11 can for example correspond with a selector or a multiplexer, switch 5 can for example correspond with a demultiplexer, and switch 3 can for example correspond with a multiplexer or a demultiplexer. Each switch can for example further correspond with a power divider. Sine shaper 22 and D/A converter 21 can for example also receive a clock signal, from clock generator 30 and/or multiplier 31.

The first control signal and the second control signal respectively may be completely different control signals or may be the same control signal having a first value and a second value respectively. Further, a third control signal etc. being a completely different control signal or being the same control signal having a third value etc. is not to be excluded, for example for creating a third mode, like a standby mode etc. So, the transceiver according to the invention comprises a multi-state (dual-state or more) DDS driven PLL.

In addition to said first and second filters 12,13, a third filter etc. is not to be excluded, for example for allowing different kinds of modulation signals to be dealt with differently in said PLL.

The fact that said DDS driven PLL, in said transmitting mode, is in a modulating state, implies that during at least a part of the first time-interval, said modulation signal is supplied to the DDS. And the fact that said DDS driven PLL, in said receiving mode, is in a non-modulation state, implies that during at least a part of the second time-interval, said non-modulation signal is supplied to the DDS. During a possible third time-interval, either said modulation signal or said non-modulation signal or a different signal or no signal at all may be supplied to said DDS.

The invention claimed is:

1. A transceiver comprising:
    a digital synthesizer; and
    a phase locked loop coupled to the digital synthesizer;
    wherein when the transceiver is in a transmitting mode, the digital synthesizer is configured to receive a modulation signal, modulate a reference signal in response to the modulation signal, and transmit the modulated reference signal to the phase locked loop;
    wherein when the transceiver is in a receiving mode, the digital synthesizer is configured to receive a non-modulation signal, generate a non-modulated reference signal, and transmit the non-modulated reference signal to the phase locked loop; and
    wherein the digital synthesizer and the phase locked loop form a digital synthesizer-driven phase locked loop, and the digital synthesizer driven phase locked loop is configured to operate in a modulating state when the transceiver is in the transmitting mode and is configured to operate in an oscillating state when the transceiver is in the receiving mode.

2. The transceiver in accordance with claim 1 wherein the phase locked loop is configured to perform a first filtering performance when the transceiver is in the transmitting mode and is configured to perform a second filtering performance different from the first filtering performance when the transceiver is in the receiving mode.

3. The transceiver in accordance with claim 1 wherein the phase locked loop is configured to perform a first filtering performance in response to a first control signal and is configured to perform a second filtering performance different from the first filtering performance in response to a second control signal.

4. A phase locked loop in accordance with claim 1 wherein the phase locked loop is configured to perform the first filtering in response to a first control signal, and is configured to perform the second filtering in response to a second control signal.

5. A transceiver comprising:
a digital synthesizer;
a phase locked loop;
a modulation signal generator configured to transmit a modulation signal to the digital synthesizer in response to a first control signal; and
a non-modulation signal generator configured to transmit a non-modulation signal to the digital synthesizer in response to a second control signal;
wherein in response to receiving the modulation signal, the digital synthesizer is configured to modulate a reference signal by the modulation signal and to transmit the modulated reference signal to the phase locked loop;
wherein in response to receiving the non-modulation signal, the digital synthesizer is configured to generate a non modulated reference signal and to transmit the non-modulated reference signal to the phase locked loop;
wherein the first control signal is generated when the transceiver is in a transmitting mode and the second control signal is generated when the transceiver is in a receiving mode; and
wherein the digital synthesizer and the phase locked loop form a digital synthesizer-driven phase locked loop, and the digital synthesizer driven phase locked loop is configured to operate in a modulating state when the transceiver is in the transmitting mode and is configured to operate in an oscillating state when the transceiver is in the receiving mode.

6. A unit comprising:
a transceiver comprising,
a digital synthesizer, and
a phase locked loop;
wherein when the transceiver is in a transmitting mode, the digital synthesizer is configured to receive a modulation signal, modulate a reference signal in response to the modulation signal, and transmit the modulated reference signal to the phase locked loop;
wherein when the transceiver is in a receiving mode, the digital synthesizer is configured to receive a non-modulation signal, generate a non-modulated reference signal, and transmit the non-modulated reference signal to the phase locked loop; and
wherein the digital synthesizer and the phase locked loop form a digital synthesizer-driven phase locked loop, and the digital synthesizer-driven phase locked loop is configured to operate in a modulating state when the transceiver is in the transmitting mode and is configured to operate in an oscillating state when the transceiver is in the receiving mode.

7. A method of transmitting signals, the method comprising:

transmitting a modulation signal to a digital synthesizer of a transceiver when the transceiver is in a transmitting mode;
transmitting a non-modulation signal to the digital synthesizer when the transceiver is in a receiving mode;
in response to receiving the modulation signal, modulating by the digital synthesizer a reference signal by the modulation signal and transmitting the modulated reference signal to a phase locked loop of the transceiver;
in response to receiving the non-modulation signal, generating by the digital synthesizer a non-modulated reference signal and transmitting the non-modulated reference signal to the phase locked loop;
operating the digital synthesizer and the phase locked loop as a digital synthesizer-driven phase locked loop;
operating the digital synthesizer-driven phase locked loop in a modulating state when the transceiver is in the transmitting mode; and
operating the digital synthesizer-driven phase locked loop in an oscillating state when the transceiver is in the receiving mode.

8. The method in accordance with claim 7 further comprising:
performing a first filtering performance using the phase locked loop when the transceiver is in the transmitting mode; and
performing a second filtering performance different from the first filtering using the phase locked loop when the transceiver is in the receiving mode.

9. The method in accordance with claim 7 further comprising:
in response to a first control signal, performing a first filtering performance using the phase locked loop; and
in response to a second control signal, performing a second filtering performance different from the first filtering performance using the phase locked loop.

10. The method in accordance with claim 8 wherein the first control signal is generated when the transceiver is in a transmitting mode and the second control signal is generated when the transceiver is in a receiving mode.

11. A method of transmitting signals, the method comprising:
in response to receiving a modulation signal, modulating by a digital synthesizer of a transceiver a reference signal by a modulation signal and transmitting the modulated reference signal to a phase locked loop of the transceiver;
in response to receiving a non-modulation signal, generating by the digitalsynthesizer a non-modulated reference signal and transmitting the non-modulated reference signal to a phase locked loop;
operating the digital synthesizer and the phase locked loop as a digital synthesizer-driven phase locked loop;
operating the digital synthesizer-driven phase locked loop in a modulating state when the transceiver is in a transmitting mode; and
operating the digital synthesizer-driven phase locked loop in an oscillating state when the transceiver is in a receiving mode;
wherein the modulation signal is transmitted to the digital synthesizer by a modulation signal generator when the transceiver is in the transmitting mode, and
wherein the non-modulation signal is transmitted to the digital synthesizer by a non-modulation signal generator when the transceiver is in the receiving mode.

12. The method in accordance with claim 11 further comprising:

performing a first filtering performance using the phase locked loop when the transceiver is in the transmitting mode; and performing a second filtering performance different from the first filtering using the phase locked loop when the transceiver is in the receiving mode.

13. The method in accordance with claim 11 further comprising:

in response to a first control signal, performing a first filtering performance using the phase locked loop; and in response to a second control signal, performing a second filtering performance different from the first filtering performance using the phase locked loop.

14. The method in accordance with claim 13 wherein the first control signal is generated when the transceiver is in a transmitting mode and the second control signal is generated when the transceiver is in a receiving mode.

15. A method of transmitting signals, the method comprising:

in response to receiving a first control signal, transmitting a modulation signal to a digital synthesizer of a transceiver;

in response to receiving a second control signal, transmitting a non-modulation signal to the digital synthesizer;

operating the digital synthesizer and the phase locked loop as a digital synthesizer-driven phase locked loop;

operating the digital synthesizer-driven phase locked loop in a modulating state when the transceiver is in the transmitting mode; and operating the digital synthesizer-driven phase locked loop in an oscillating state when the transceiver is in the receiving mode wherein the first control signal is generated when the transceiver is in the transmitting mode and the second control signal is generated when the transceiver is in the receiving mode.

16. The method in accordance with claim 15 further comprising:

in response to receiving the first control signal, performing a first filtering performance using the phase locked loop; and in response to receiving the second control signal, performing a second filtering performance different from the first filtering performance using the phase locked loop.

17. The method in accordance with claim 15 further comprising:

in response to receiving the modulation signal, modulating by the digital synthesizer a reference signal by the modulation signal and transmitting the modulated reference signal to a phase locked loop of the transceiver, and in response to receiving a non-modulation signal, generating by the digital synthesizer a non-modulated reference signal and transmitting the non-modulated reference signal to the phase locked loop.

* * * * *

UNITED STATES PATENT AND TRADEMARK OFFICE
CERTIFICATE OF CORRECTION

PATENT NO.         : 7,792,509 B2
APPLICATION NO.    : 10/500620
DATED              : September 7, 2010
INVENTOR(S)        : Liu Page 1 of 1

It is certified that error appears in the above-identified patent and that said Letters Patent is hereby corrected as shown below:

In the Claims

In Column 8, Line 37, in Claim 10, delete "claim 8" and insert -- claim 9 --, therefor.

In Column 8, Line 49, in Claim 11, delete "digitalsynthesizer" and insert -- digital synthesizer --, therefor.

In Column 8, Line 51, in Claim 11, delete "a phase" and insert -- the phase --, therefor.

In Column 9, Line 28, in Claim 15, delete "is in the" and insert -- is in a --, therefor.

In Column 10, Lines 2-3, in Claim 15, delete "the receiving mode" and insert -- a receiving mode; --, therefor.

Signed and Sealed this
Twenty-first Day of June, 2016

Michelle K. Lee
*Director of the United States Patent and Trademark Office*